(12) United States Patent
Li

(10) Patent No.: US 8,319,744 B2
(45) Date of Patent: Nov. 27, 2012

(54) MULTI-TOUCH RESISTIVE TOUCH PANEL AND DETECTING METHOD

(75) Inventor: Jian-Feng Li, Waipu Township, Taichung County (TW)

(73) Assignee: Wintek Corporation, Taichung (TW)

( * ) Notice: Subject to any disclaimer, the term of this patent is extended or adjusted under 35 U.S.C. 154(b) by 428 days.

(21) Appl. No.: 12/608,122

(22) Filed: Oct. 29, 2009

(65) Prior Publication Data

US 2010/0110039 A1    May 6, 2010

(30) Foreign Application Priority Data

Nov. 4, 2008  (TW) ............................... 97142575 A

(51) Int. Cl.
*G06F 3/041*     (2006.01)
(52) U.S. Cl. ...................................... 345/173; 178/18.05
(58) Field of Classification Search .................. 345/173, 345/174; 178/18.03, 18.05
See application file for complete search history.

(56) References Cited

U.S. PATENT DOCUMENTS

| | | | |
|---|---|---|---|
| 7,663,607 B2 | 2/2010 | Hotelling et al. | |
| 2002/0000979 A1* | 1/2002 | Furuhashi et al. | 345/173 |
| 2002/0101399 A1* | 8/2002 | Kubo et al. | 345/104 |
| 2003/0095112 A1* | 5/2003 | Kawano et al. | 345/173 |
| 2004/0212599 A1* | 10/2004 | Cok et al. | 345/173 |
| 2006/0170658 A1* | 8/2006 | Nakamura et al. | 345/173 |
| 2008/0018608 A1 | 1/2008 | Serban et al. | |
| 2008/0117178 A1* | 5/2008 | Ko et al. | 345/173 |
| 2008/0316182 A1* | 12/2008 | Antila et al. | 345/173 |
| 2009/0066670 A1 | 3/2009 | Hotelling et al. | |
| 2009/0096757 A1 | 4/2009 | Hotelling et al. | |
| 2009/0096758 A1 | 4/2009 | Hotelling et al. | |
| 2009/0096766 A1* | 4/2009 | Liu | 345/174 |
| 2009/0146963 A1* | 6/2009 | Yeh et al. | 345/173 |
| 2009/0273571 A1* | 11/2009 | Bowens | 345/173 |
| 2010/0007619 A1* | 1/2010 | Jiang et al. | 345/173 |

FOREIGN PATENT DOCUMENTS

| | | |
|---|---|---|
| CN | 1912820 | 2/2007 |
| CN | 1942853 | 4/2007 |
| TW | 200634635 | 10/2006 |
| TW | 200704944 | 2/2007 |

OTHER PUBLICATIONS

Chinese language office action dated Aug. 17, 2011.
English language translation of abstract of CN 1912820 (published Feb. 14, 2007).
English language translation of abstract of CN 1942853 (published Apr. 4, 2007).

(Continued)

*Primary Examiner* — Chanh Nguyen
*Assistant Examiner* — Roy Rabindranath
(74) *Attorney, Agent, or Firm* — Thomas|Kayden

(57) ABSTRACT

A multi-touch resistive touch panel including a first substrate, a second substrate and a spacing element is provided. The spacing element is disposed between the first substrate and the second substrate. The first substrate has a first transparent electrode, two first conductive electrodes and two second conductive electrodes, wherein the first conductive electrodes are disposed at two boundaries of the first transparent electrode in parallel, and the second conductive electrode are disposed at another two boundaries of the first transparent electrode in parallel and perpendicular to the first conductive electrodes. The second substrate has many second transparent electrodes disposed on a surface of the second substrate facing the first transparent electrode and arranged in a first axial direction, and the second transparent electrodes themselves are extended in a second axial direction perpendicular to the first axial direction.

12 Claims, 8 Drawing Sheets

OTHER PUBLICATIONS

Taiwanese language office action dated Jun. 22, 2012.
English language translation of abstract of TW 200634635 (published Oct. 1, 2006).
English language translation of abstract of TW 200704944 (published Feb. 1, 2007).

* cited by examiner

MULTI-TOUCH RESISTIVE TOUCH PANEL AND DETECTING METHOD

This application claims the benefit of Taiwan application Serial No. 97142575, filed Nov. 4, 2008, the subject matter of which is incorporated herein by reference.

BACKGROUND OF THE INVENTION

1. Field of the Invention

The invention relates in general to a touch panel, and more particularly to a multi-touch resistive touch panel.

2. Description of the Related Art

In terms of touch panel technology, there are resistive, capacitive, infra-red and ultra-sonic touch panels commonly seen in the market. For the time being, the resistive type and the capacitive type touch panels are the mainstream products, especially the resistive touch panel has more than a half of the market shares. The capacitive type touch panel started to attract great attention along with the announcement of the iPhone product and is gradually used in other products. The reason why the capacitive touch panel attracts great attention along with the announcement of the iPhone product is that the capacitive touch panel provides multi-touch function so as to provide special functions such as image scaling. However, such function is still unavailable in various conventional resistive touch panels. Thus, how to provide multi-touch function to resistive touch products has become a focus to the manufacturers.

SUMMARY OF THE INVENTION

The invention is directed to a multi-touch resistive touch panel and a method for detecting multiple touch points. Through the design of patterning the transparent electrode of a substrate and the design of incorporating the conductive electrode of another substrate as a signal detecting end, the resistive touch panel is equipped with multi-touch detecting function.

According to a first aspect of the present invention, a multi-touch resistive touch panel including a first substrate, a second substrate and a spacing element is provided. The spacing element is disposed between the first substrate and the second substrate. The first substrate has a first transparent electrode, two first conductive electrodes and two second conductive electrodes, wherein the first conductive electrodes are disposed at two boundaries of the first transparent electrode in parallel, and the second conductive electrode are disposed at another two boundaries of the first transparent electrode in parallel and perpendicular to the first conductive electrodes. The second substrate has many second transparent electrodes arranged in a first axial direction and disposed on a surface of the second substrate facing the first transparent electrode, and the second transparent electrodes themselves are extended in a second axial direction perpendicular to the first axial direction.

According to a second aspect of the present invention, a resistive touch panel and a detecting method thereof are provided. The method includes the following steps. Firstly, the touch mode of a touch panel is determined. If the touch mode is determined as a multi-touch mode, then the method proceeds to the next step. Next, the two first conductive electrodes or the two second conductive electrodes of a first substrate are driven as a first signal detecting end. Then, the second transparent electrodes of the second substrate facing the first substrate are sequentially detected, the positions of multiple touch points in a first axial direction which the second transparent electrodes are arranged are obtained according to all of contact positions on the second transparent electrodes which generate signal detected at the first signal detecting end, and all of the resistances at the touch ends of the second transparent electrodes which generate signals are measured so as to obtain the positions of multiple touch points in a second axial direction which the second transparent electrodes are respectively extended.

The invention will become apparent from the following detailed description of the preferred but non-limiting embodiments. The following description is made with reference to the accompanying drawings.

DETAILED DESCRIPTION OF THE INVENTION

Figure 1:
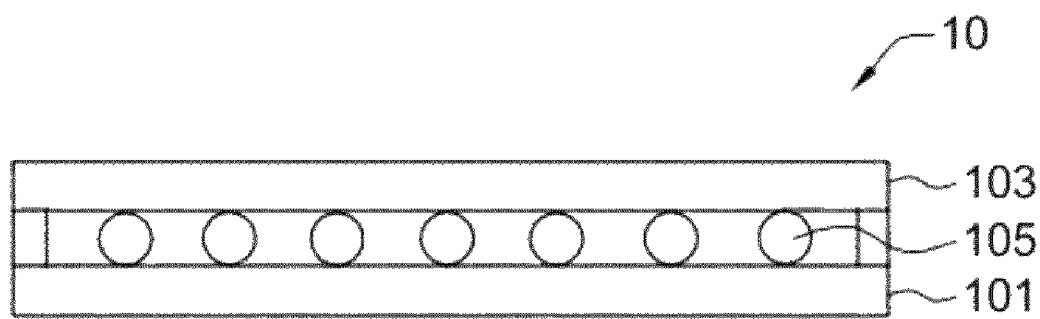
FIG. 1 shows a multi-touch resistive touch panel according to a preferred embodiment of the invention.
Figure 2:
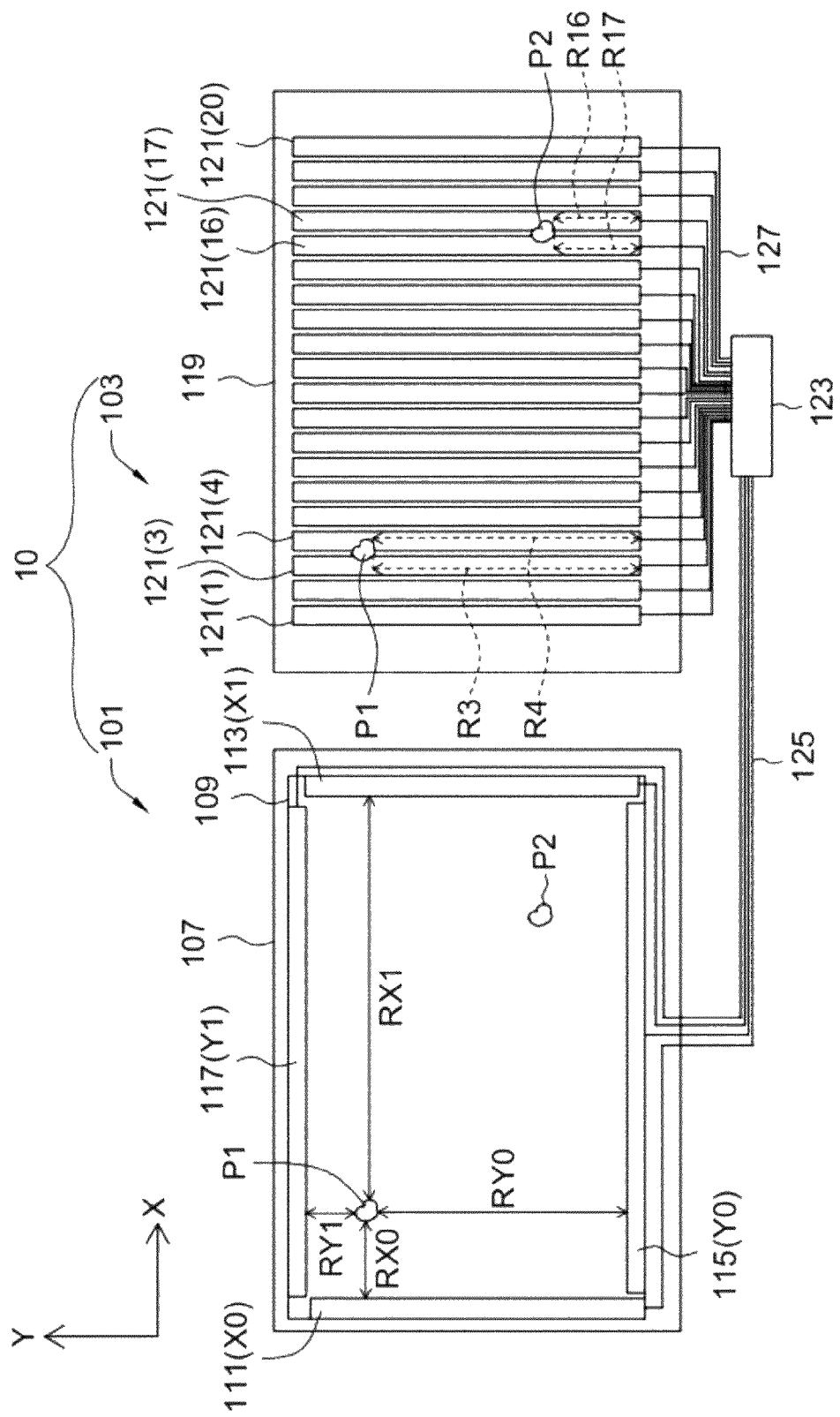
FIG. 2 shows a planar view of a first substrate and a second substrate of FIG. 1.

FIG. 1 shows a multi-touch resistive touch panel according to an embodiment of the invention. FIG. 2 shows a planar view of a first substrate and a second substrate of FIG. 1. As indicated in FIG. 1, the multi-touch resistive touch panel 10 includes a first substrate 101, a second substrate 103 and a spacing element 105, wherein the spacing element 105 is disposed between the first substrate 101 and the second substrate 103. As indicated in FIG. 2, the first substrate 101 includes a first transparent base 107, a first transparent electrode 109, two first conductive electrodes 111 and 113 and two second conductive electrodes 115 and 117, wherein the first transparent electrode 109 is disposed on the first transparent base 107, the first conductive electrodes 111 and 113 are disposed at two boundaries of the first transparent electrode 109 in parallel, and the second conductive electrodes 115 and 117 are disposed at another two boundaries of the first transparent electrode 109 in parallel and are perpendicular to the first conductive electrodes 111 and 113. The second substrate 103 includes a second transparent base 119 and a plurality of second transparent electrodes 121 wherein the second transparent 119 faces the first transparent 109. The second transparent electrodes 121 are disposed on a surface of the second transparent base 119 in the form of bar structures arranged in a first axial direction, and themselves are extended in a second axial direction perpendicular to the first axial direction and preferably consistent with the extending direction of the first conductive electrodes 111 and 113. In the present embodiment of the invention, the first axial direction is exemplified by the X-axial direction, and the second axial direction is exemplified by the Y-axial direction.

The first transparent base 107 and the second transparent base 119 are made of glass, acrylic or engineering plastic. The first transparent electrode 109 and the second transparent electrodes 121 can be made of a transparent conductive material such as metal oxides like ITO, IZO, ZnO, and SnO. The spacing element 105 is made of glass, plastic polymer and oxide, and disposed between the first substrate 101 and the second substrate 103 by printing, exposing and developing or sputtering. The height of the spacing element 105 preferably ranges between about 20 and 200 μm.

As indicated in FIG. 2, the resistive touch panel 10 further includes a control module 123 which is connected to the first conductive electrodes 111 and 113 and the second conductive electrodes 115 and 117 of the first substrate 101 through the signal lines 125 respectively and is connected to the second transparent electrodes 121 of the second substrate 103 through signal lines 127 respectively. Through the structural design of the first substrate 101 and the second substrate 103 and the operation of the control module 123, the multi-touch resistive touch panel 10 of the present embodiment of the invention can be switched between a multi-touch mode and a single-touch mode to detect multiple touch points or single touch point.

Figure 3:
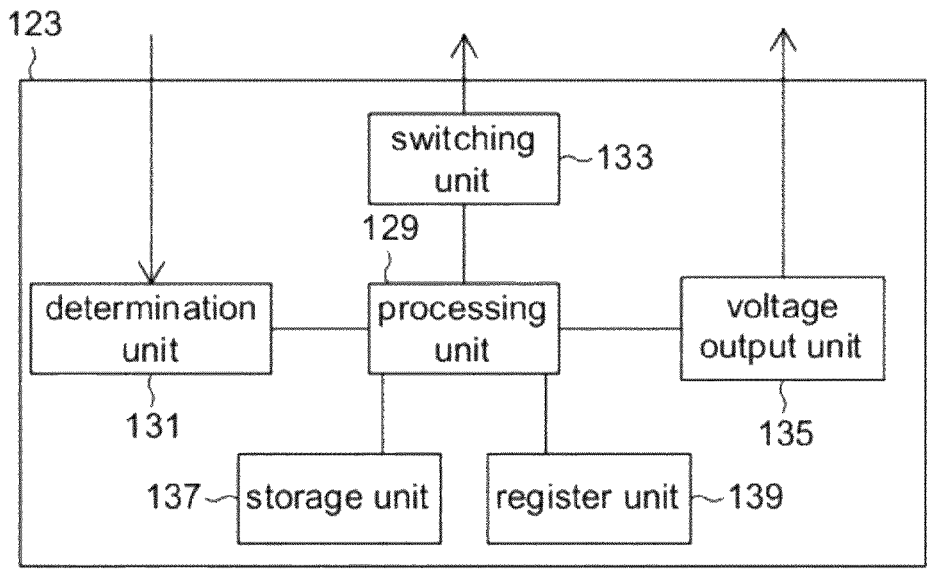
FIG. 3 shows a circuit block diagram of the control module of FIG. 2.

Referring to FIG. 3, a circuit block diagram of the control module of FIG. 2 is shown. As indicated in FIG. 3, the control module 123 includes a processing unit 129, a determination unit 131, a switching unit 133, a voltage output unit 135, a storage unit 137 and a register unit 139. The determination unit 131 is used for determining whether the touch panel 10 is in a single-touch mode or a multi-touch mode.

In the multi-touch mode, the switching unit 133 of the control module 123 drives the pair of the first conductive electrodes 111 and 113 or the second conductive electrodes 115 and 117 as a first signal detecting end. The voltage output unit 135 is used for providing a voltage to the second transparent electrodes 121. The storage unit 137 is used for storing the data of a plurality of predetermined resistances of the multi-touch mode. The processing unit 129 determines the positions in the first axial direction (the X axial direction) according to the second transparent electrodes 121 which generate touch signals, and further determines the positions in the second axial direction (Y axial direction) by detecting the resistance at the touch ends of the second transparent electrodes 121. The register unit 139 is used for sequentially storing the position data of the multiple touch points.

In the single-touch mode, the switching unit 133 enables the second transparent electrodes 121 to be serially connected and short-circuited as a second signal detecting end. The voltage output unit 135 alternately provides a voltage to the first conductive electrodes 111 and 113 and the second conductive electrodes 115 and 117 so as to form electric fields of two different directions. When the first conductive electrodes 111 and 113 are electrified, the processing unit 129 obtains the position of the single touch point in the first axial direction (X axial direction) according to the voltage detected at the second signal detecting end. Next, when the second conductive electrodes 115 and 117 are electrified, the processing unit 129 further obtains the position of the single touch point and the position in the second axial direction (Y axial direction) according to the voltage detected at the second signal detecting end. Thus, the exact position of the single touch point is obtained.

Figure 4:
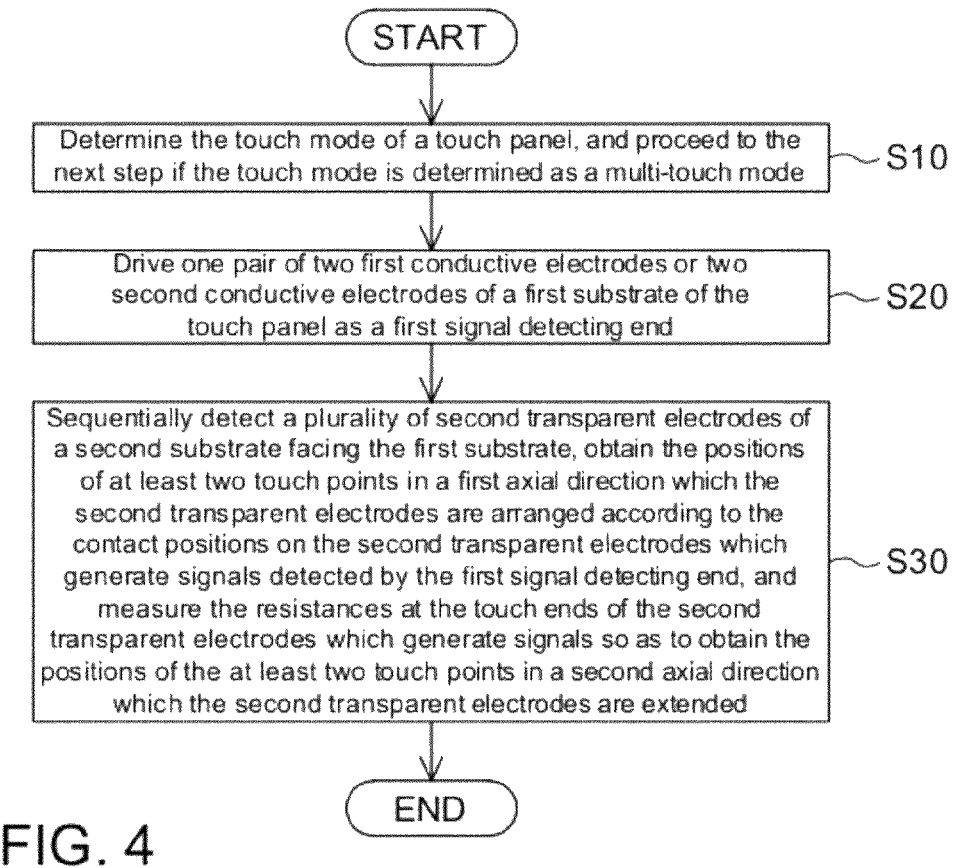
FIG. 4 shows a method for detecting multiple touch points of resistive touch panel.

The present embodiment of the invention further provides a method for detecting multiple touch points of resistive touch panel. As indicated in FIG. 4, the method for detecting multiple touch points includes steps S10, S20 and S30. The method begins at step S10, the touch mode of the touch panel 10 is determined: if the touch mode is determined as a multi-touch mode, then the method proceeds to the next step, that is, step S20. As indicated in FIG. 3, the determination unit 131 of the control module 123 determines the touch mode of the touch panel 10 according to a received external signal. Taking the electronic device 400 (shown in FIG. 10) with photo or image display function for example, the external signal can be generated to the determination unit 131 when a photo or an image is opened, and the processing unit 129 determines to select the multi-touch mode after receiving the determination signal from the determination unit 131.

Next, the method proceeds to step S20, one pair of the two first conductive electrodes 111 and 113 or the two second conductive electrodes 115 and 117 of the first substrate 101 is driven as a first signal detecting end. As indicated in FIG. 3, the switching unit 133, according to the signal transmitted to the processing unit 129, selects at least one or all of the first conductive electrodes 111 and 113 and the second conductive electrodes 115 and 117 as the first signal detecting end for measuring the resistance. As indicated in FIG. 2, the electrode positions of the first conductive electrodes 111 and 113 and the second conductive electrodes 115 and 117 are respectively defined as X0, X1, Y0 and Y1 for example. In the present embodiment of the invention herebelow, the second conductive electrode 115 (Y0) is used as the first signal detecting end.

Figure 5:
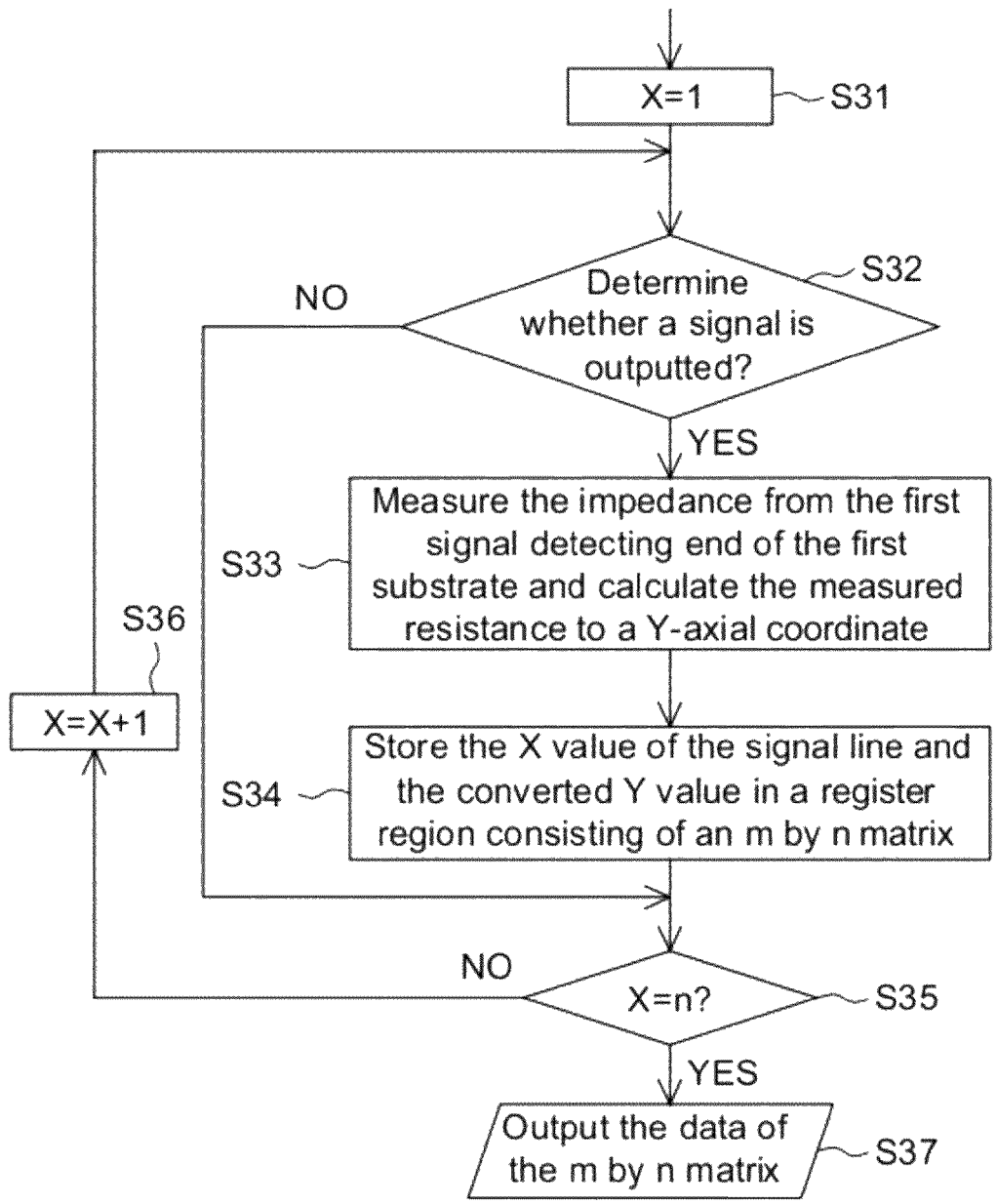
FIG. 5 shows a detailed flowchart of detecting touch point in a multi-touch mode.

Then, the method proceeds to step S30, the second transparent electrodes 121 of the second substrate 103 facing the first substrate 101 are sequentially detected, the positions of multiple touch points in the first axial direction (X axial direction) of the second transparent electrodes 121 are obtained according to the contact positions on the second transparent electrodes 121 which generate signals detected by the first signal detecting end, and the resistances at the touch ends of the second transparent electrodes 121 which generate signals are measured so as to obtain the positions of multiple touch points in the second axial direction (the Y axial direction) that the second transparent electrodes 121 are respectively extended. Referring to FIG. 5, a detailed flowchart of detecting touch point in a multi-touch mode is shown.

Take the detection of two touch points P1 and P2 shown in FIG. 2 for example. During the X-axial detection, the X-axial position can be determined by confirming which of the signal lines 127 receives signals. During the Y-axial detection, the resistance at the signal line corresponding to the second transparent electrodes 121 which receives signal is calculated so as to obtain the position on the Y-axis. When detecting the X-axial position, the second transparent electrodes are scanned from the second transparent electrode 121(1) to the second transparent electrode 121(20), wherein the X-axial position of the second transparent electrode 121(1) is defined as X=1, and the X-axial position of the second transparent electrode 121(20) is defined as X=n. As indicated in step S31 of FIG. 5, the detection of signals starts with the position where X=1. Next, the method proceeds to step S32 to determine the signal output or not. As the touch point P1 is positioned on the second transparent electrodes 121(3) and 121(4), there is no signal output at the second transparent electrodes 121(1) (X=1), so that the method skips to step S35 to determine whether X=n or not. As X≠n at the position of detection, the method proceeds to step S36, the value of X is added by 1, and the method returns to step S32 to continually detect the next second transparent electrode 121(2). When the second transparent electrode 121(3) where signal is generated is detected, the method proceeds to step S33, the resistance measured at the first signal detecting end of the first substrate 101 is calculated to a Y-axial coordinate.

As indicated in FIG. 2, according to the pre-defined position of the first signal detecting end, the resistance from the touch point P1 to the first signal detecting end can be RX0, RX1, RY0 or RY1. In the present embodiment of the invention, the second conductive electrode 115 (Y0) is used as the first signal detecting end, so the resistance from the touch point P1 to the first signal detecting end is RY0, and the resistance of the touch point P1 at the touch end of the second transparent electrode 121(3) is R3. The processing unit 129 converts the measured resistance R3 to determine the Y-axial coordinate of the touch point P1 according to the data of the predetermined resistances stored in the storage unit 137.

Then, as indicated in step S34 of FIG. 5, the X value of the signal line and the converted Y value are stored in a register region consisting of an m by n matrix. That is, once the position of a touch point is obtained, the position information is stored in the register region, which is located in the register unit 139. Then, the next signal line is scanned and the above step is repeated so as to obtain the touch end resistance R4 of the touch point P1 on the second transparent electrode 121(4). Based on the two coordinate positions being obtained, the exact X-axial and Y-axial coordinates of the touch point P1 are obtained. Next, through the same way of scanning, the exact position of the touch point P2 is obtained according to the contact position of the second transparent electrodes 121(16) and 121(17) and the resistances R16 and R17 measured thereon.

With respect to the Y-axial coordinate of the touch point P1 determined by the total resistance RT consisting of RY0 and R3, the resistance R3 is greater than the resistance RY0 preferably by 10 times or a hundred times so as to reduce the Y-axial error caused by the resistance RY0 and achieve an accurate detection. Besides, during the resistance-to-coordinate conversion, a resistance compensation parameter can be added to reduce the Y-axial error caused by the resistance RY0.

Figure 6:
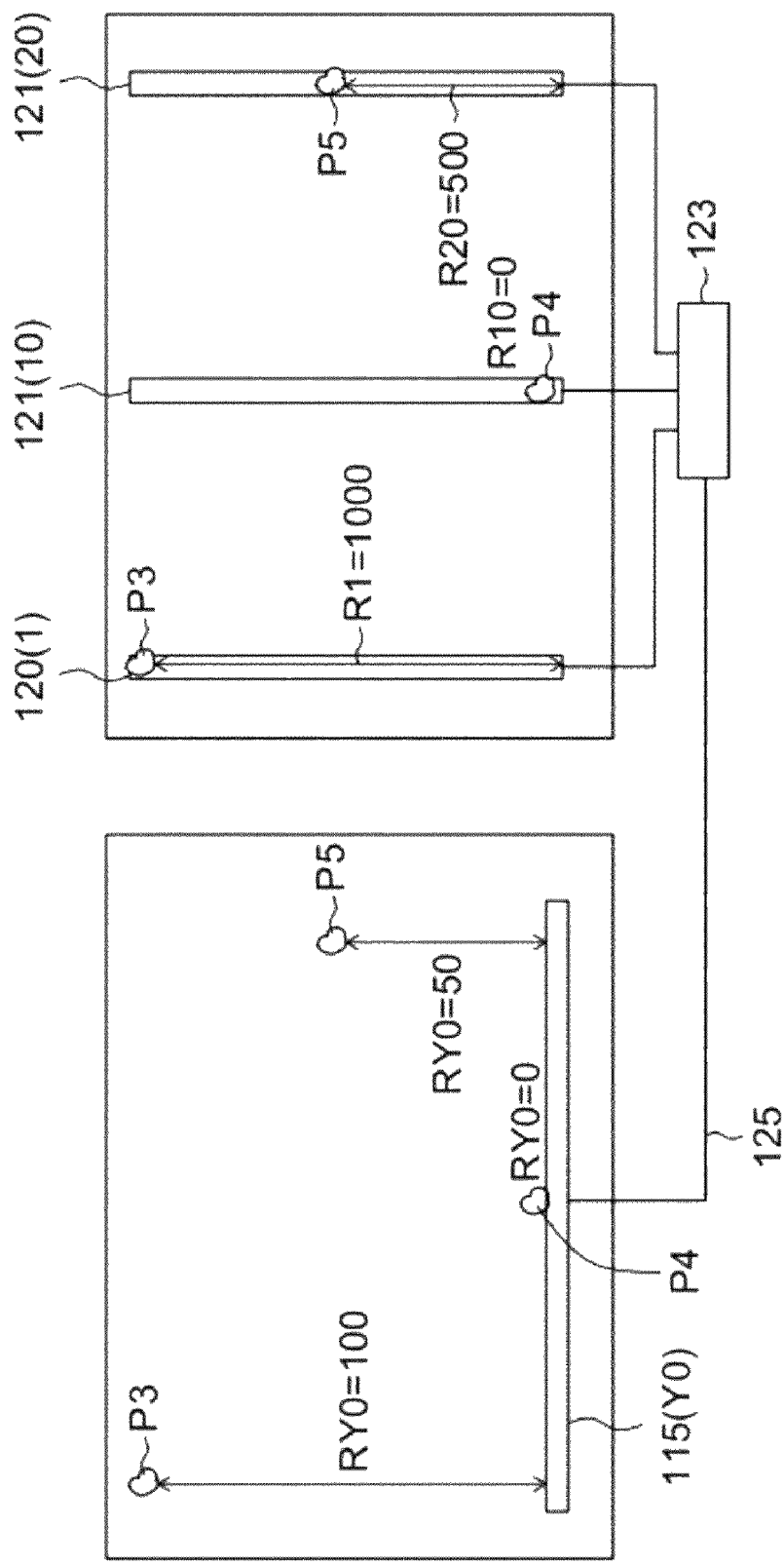
FIG. 6 shows a resistance design of different touch points on a substrate.

The determination and compensation of resistance are exemplified below. Referring to FIG. 6, a resistance design of different touch points on a substrate is shown wherein Y0 denotes a signal detecting end. When the resistance RY0 at the signal detecting end Y0 is close to the touch end resistance, the resistance RY0 at the signal detecting end Y0 may result in an error during detection. Therefore, the resistance RY0 must be taken into consideration so as to add a resistance compensation parameter into calculation. As indicated in FIG. 6, the touch end resistance is ten times of the resistance RY0 at the signal detecting end Y0. For example, if the resistance RY0 at the touch point P3 is 100Ω, then the corresponding touch end resistance R1 on the second transparent electrode 121(1) is 1000Ω; if the resistance RY0 at the touch point P4 is 0, then the corresponding touch end resistance R10 on the second transparent electrode 121(10) is also 0; if the resistance RY0 at the touch point P5 is 50Ω, then the corresponding touch end resistance R20 on the second transparent electrode 121(20) is 500Ω. The above-mentioned resistance compensation parameter can be defined as: the touch end resistance divided by the signal detecting end resistance. The total resistance RTi at different position is expressed as: RTi=Ri+Ri/compensation parameter Wherein, Ri denotes the touch end resistance at a particular position, and compensation parameter is 10 in the above exemplification.

When the contact point is located at a position farthest away from the signal detecting end, such as the touch point P3, the contact point resistance is equal to the terminal resistance at the touch end, and the total resistance is expressed as: RT1=1000+(1000/10)=1100Ω.

When the contact point is located at a position nearest to the signal detecting end, such as the touch point P4, the contact point resistance is almost 0, and the total resistance is expressed as: RT10=0+(0/10)=0.

When the contact point is located at the middle position of the touch end, such as the touch point P5, the contact point resistance is equal to a half of the terminal resistance at the touch end, and the total resistance is expressed as: RT1=500+(500/10)=550Ω.

According to the resistance design exemplified above, the Y-axial coordinates of multiple touch points in the multi-touch mode can be obtained according to the proportional change in resistance.

Figure 7:
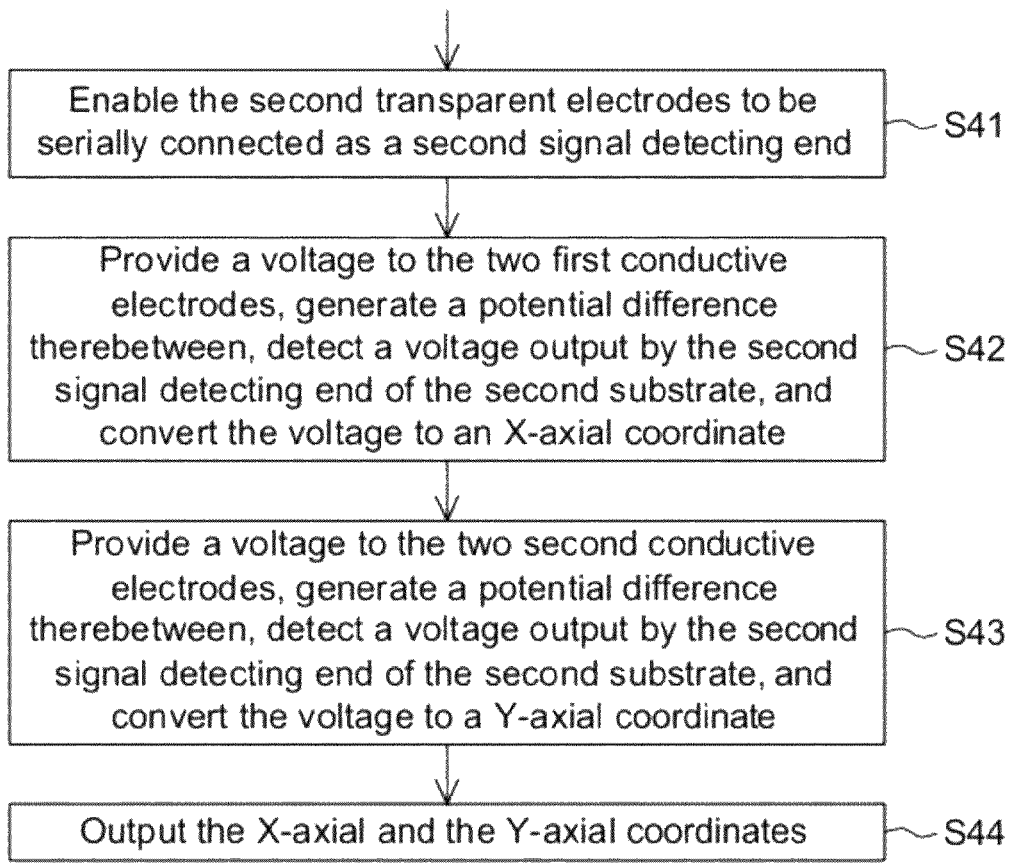
FIG. 7 shows a detailed flowchart of detecting touch point in a single-touch mode.

In step S10 (illustrated in FIG. 4) the touch panel 10 detects the position by way of analogy when the touch mode is determined as a single-touch mode. Referring to FIG. 7, a detailed flowchart of detecting touch point in a single-touch mode is shown. In step S41, all of the second transparent electrodes 121 of the second substrate 103 (illustrated in FIG. 2) are serially connected as a second signal detecting end.

Then, the method proceeds to step S42, a voltage is provided to two first conductive electrodes 111 and 113 of the first substrate 101 to generate a potential difference therebetween, and the output voltage is detected by the second signal detecting end of the second substrate 103 such that the X-axial coordinate is obtained. When potential difference exists between the first conductive electrodes 111 and 113, an electric field of the X direction is generated and distributed between the first conductive electrodes 111 and 113. Then, whenever a touch event enables the first substrate 101 and the second substrate 103 to come into contact, the second substrate 103 being used as the second signal detecting end carries away a small amount of current from the first substrate 101. Thus, the processing unit 129 of the control module 123 (illustrated in FIG. 3) calculates the X-axial coordinate according to the proportion of the current being carried away.

Then, the method proceeds to step S43, a voltage is provided to two second conductive electrodes 115 and 117 of the first substrate 101 to generate a potential difference therebetween, and a voltage output is detected by the second signal detecting end of the second substrate 103 such that the Y-axial coordinate is obtained. When potential difference exists between the second conductive electrodes 115 and 117, an electric field of the Y direction is generated and distributed between the second conductive electrodes 115 and 117. Likewise, whenever a touch event occurs, the processing unit 129 calculates the Y-axial coordinate according to the proportion of the current being carried away.

In step S44, the information of these coordinates is output and the detection of the single touch point is completed after both the X-axial coordinate and the Y-axial coordinate of the single touch point are obtained.

Figure 8A:
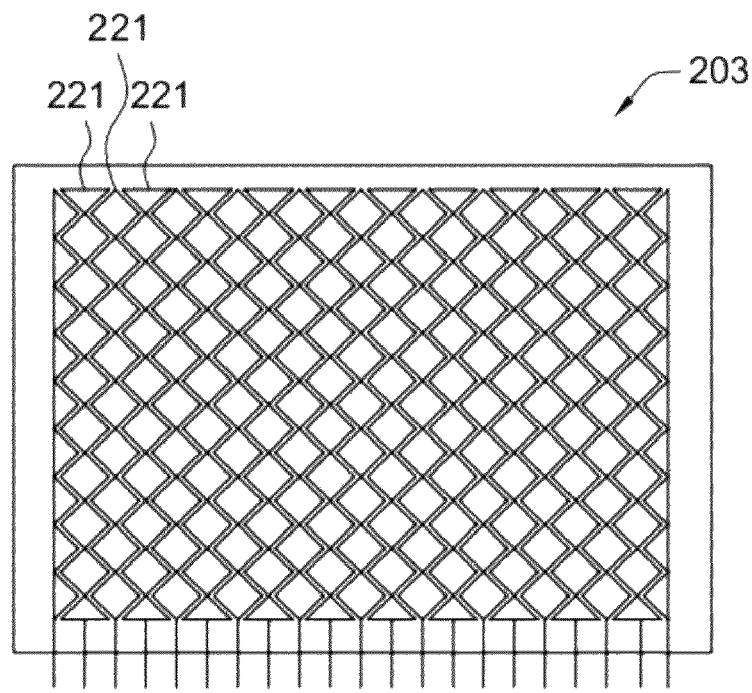
FIG. 8A shows a second substrate consisting of diamond-shaped transparent electrodes.
Figure 8B:
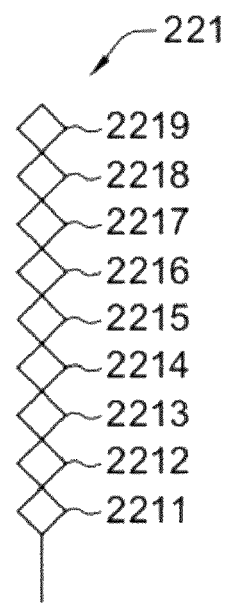
FIG. 8B shows a single second transparent electrode of FIG. 8A.

In the present embodiment of the invention, each second transparent electrode 121 of the second substrate 103 is but not limit to a bar structure. The second transparent electrodes can be other electrode patterns exemplified below. Referring to FIG. 8A and FIG. 8B, FIG. 8A shows a second substrate consisting of diamond-shaped transparent electrodes, and FIG. 8B shows a single second transparent electrode of FIG. 8A. Each of the second transparent electrodes 221 of the second substrate 203 is formed by a plurality of diamond-shaped transparent blocks 2211~2219 serially connected to each other without overlapping. The resistance detection for such electrode pattern is mainly focused on the diamond-shaped transparent blocks. According to the resistance calculation formula, the resistance is inversely proportional to the cross-section area through which the current flows. Due to the junction between two diamond-shaped transparent blocks of a single second transparent electrode 221 having the smallest cross-section area, the resistance is mainly determined by the junction of the transparent blocks.

Refer to FIG. 8A and FIG. 8B, the diamond-shaped transparent blocks respectively represent different resistance regions. Let the cross-impedance at the junction between two adjacent diamond-shaped transparent blocks be 100Ω, the resistance at other positions can be obtained accordingly. For example, when the measured resistance ranges between 0 and 100Ω, the position of the touch point is the position of the transparent block 2211; when the resistance ranges between 100 and 200Ω, the position of the touch point is the position of the transparent block 2212. The positions of other touch points can be obtained in the same manner and their Y-axial coordinates are calculated accordingly.

Figure 9:
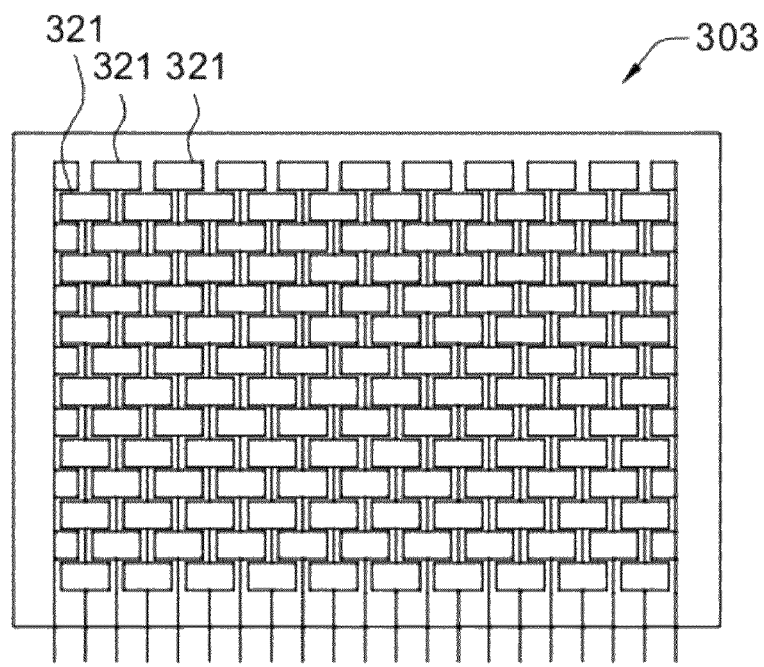
FIG. 9 shows a second substrate consisting of rectangular transparent electrodes.

Referring to FIG. 9, a second substrate consisting of rectangular transparent electrodes is shown. Each of the second transparent electrodes 321 of the second substrate 303 is formed by several rectangular transparent blocks being serially connected. Likewise, in the structure of one single second transparent electrode 321, the resistance is also mainly determined by the junction between two transparent blocks, so the Y-axial coordinate can be obtained according to the resistance calculation formula of the diamond-shaped transparent blocks disclosed above and according to the resistance range being detected.

In the above embodiments, the shapes of the transparent blocks of the second transparent electrodes are exemplified by a diamond shape and a rectangle, but the invention is not limited thereto, and the transparent blocks can be of any size and any other shapes such as square, triangle, circle, polygon, ellipse, star, and so on. Besides, there is no restriction regarding the number of the transparent blocks being serially connected. Any designs, which divide the transparent electrode of a substrate into several electrodes capable of detecting signals independently, allowing the transparent blocks to have any shapes and be serially connected, are within the scope of protection of the invention.

Figure 10:
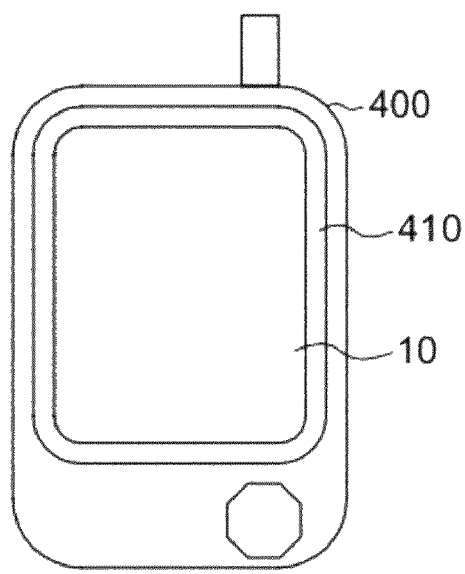
FIG. 10 shows an electronic device using the touch panel of a preferred embodiment of the invention.

The multi-touch resistive touch panel 10 disclosed in above embodiments of the invention can be integrated with a display panel 410 to apply to electronic device 400 shown in FIG. 10 wherein the resistive touch panel 10 and the display panel 410 are connected to other control circuits (not illustrated) of the electronic device 400. The resistive touch panel 10 can be switched between single-touch mode and multi-touch mode for detection and integrated with the display panel 410 that displays frames in different function modes. Compared with the conventional resistive touch panel without multiple touch function, the multi-touch resistive touch panel 10 of the present embodiment of the invention makes the electronic device 400 more advantaged.

According to the multi-touch resistive touch panel and the method for detecting multiple touch points disclosed in the above embodiments of the invention, a first transparent electrode is disposed on the first substrate of the touch panel, and four conductive electrodes are disposed on four boundaries of the first transparent electrode. In addition, a plurality of parallel second transparent electrodes are disposed on the second substrate of the touch panel in one direction. In the single-touch mode, the touch panel forms the electric fields of two directions through the alternation of the four conductive electrodes so as to obtain the exact position of a single touch point through analog manner. In the multi-touch mode, the positions of multiple touch points are determined according to the second transparent electrodes which generate signals and the touch end resistance, hence eliminating the unavailability of multi-touch function of the conventional resistive touch panel. Compared with the conventional resistive touch panel, the resistive touch panel of the above embodiment of the invention provides multi touch function to apply to specific purposes of the electronic device, such as image editing or image scaling.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A multi-touch resistive touch panel, comprising:
  a first substrate having a first transparent electrode, two first conductive electrodes and two second conductive electrodes, wherein the two first conductive electrodes are disposed at two boundaries of the first transparent electrode, and the two second conductive electrodes are disposed at another two boundaries of the first transparent electrode and are perpendicular to the two first conductive electrodes;
  a second substrate having a plurality of second transparent electrodes, wherein the second transparent electrodes are disposed on a surface of the second substrate facing the first transparent electrode and arranged in a first axial direction, and the second transparent electrodes themselves are extended in a second axial direction perpendicular to the first axial direction;
  a spacing element disposed between the first substrate and the second substrate; and
  a control module connected to the first substrate and the second substrate, whereby
  in a multi-touch mode, the control module drives the two first conductive electrodes or the two second conductive electrodes as a first signal detecting end, determines the positions in the first axial direction according to the contact positions between the second transparent electrodes and the control module, and determines the positions in the second axial direction by detecting the resistances at multiple touch ends of the second transparent electrodes; and
  in a single-touch mode, the control module enables the second transparent electrodes to be serially connected as a second signal detecting end, and further alternately drives the two first conductive electrodes and the two second conductive electrodes to form electric fields of two different directions so as to obtain the position,
  wherein the control module comprises:
  a determination unit, determining whether the touch panel is in the single-touch mode or the multi-touch mode;
  a switching unit, driving of the two first conductive electrodes or the two second conductive electrodes as the first signal detecting end in the multi-touch mode;
  a voltage output unit, providing a voltage to the second transparent electrodes in the multi-touch mode;
  a storage unit, storing a plurality of data of predetermined resistances for the multi-touch mode;
  a processing unit, determining the positions in the first axial direction according to the contact positions on the second transparent electrodes which generate signals in the multi-touch mode, determining the positions in the second axial direction according to the relationships between the resistances at the touch ends of the second transparent electrodes and the predetermined resistances; and a register unit, sequentially storing the position data of the touch points in the multi-touch mode.

2. The touch panel according to claim 1, wherein in the single-touch mode:
the switching unit further enables the second transparent electrodes to be serially connected as the second signal detecting end;
the voltage output unit further alternately provides a voltage to the two first conductive electrodes and the two second conductive electrodes; and
the processing unit further obtains the position in the first axial direction according to the voltage detected at the second signal detecting end when the two first conductive electrodes are electrified, and obtains the position in the second axial direction according to the voltage detected at the second signal detecting end when the two second conductive electrodes are electrified.

3. The touch panel according to claim 1, wherein the resistance at the touch end of each second transparent electrode is greater than the resistance at the first signal detecting end.

4. The touch panel according to claim 3, wherein the resistance at the touch end of each second transparent electrode is ten times higher than the resistance at the first signal detecting end.

5. The touch panel according to claim 1, wherein each of the second transparent electrodes has a plurality of transparent blocks being serially connected to each other without overlapping.

6. The touch panel according to claim 5, wherein the shapes of the transparent blocks comprise triangle, square, bar, diamond-shape, polygon, circle, ellipse or star.

7. The touch panel according to claim 1, wherein the first substrate further comprises a first transparent base, the second substrate further comprises a second transparent base.

8. The touch panel according to claim 7, wherein the first transparent base and the second transparent base are made of glass, acrylic or engineering plastic.

9. The touch panel according to claim 1, wherein the first transparent electrode is made of a transparent conductive material.

10. The touch panel according to claim 1, wherein the second transparent electrodes are made of a transparent conductive material.

11. The touch panel according to claim 1, wherein the spacing element is made of glass, plastics, polymer or oxide.

12. The touch panel according to claim 1, wherein the spacing element comprises a height of 20~200 μm.

* * * * *